United States Patent
Wu et al.

(10) Patent No.: US 10,797,790 B2
(45) Date of Patent: Oct. 6, 2020

(54) MICROWAVE PHOTONIC VECTOR NETWORK ANALYZER AND METHOD FOR MEASURING SCATTERING PARAMETERS OF MICROWAVE DEVICE

(71) Applicant: Shanghai Jiao Tong University, Shanghai (CN)

(72) Inventors: Guiling Wu, Shanghai (CN); Min Ding, Shanghai (CN); Zhengtao Jin, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/686,594

(22) Filed: Nov. 18, 2019

(65) Prior Publication Data
US 2020/0106520 A1 Apr. 2, 2020

Related U.S. Application Data

(63) Continuation-in-part of application No. PCT/CN2018/114490, filed on Nov. 8, 2018.

(30) Foreign Application Priority Data

May 2, 2018 (CN) .......................... 2018 1 0407639

(51) Int. Cl.
*H04B 10/071* (2013.01)
*H04B 10/073* (2013.01)
(Continued)

(52) U.S. Cl.
CPC ......... *H04B 10/071* (2013.01); *H04B 10/073* (2013.01); *H04B 10/64* (2013.01);
(Continued)

(58) Field of Classification Search
None
See application file for complete search history.

(56) References Cited

U.S. PATENT DOCUMENTS 5,274,381 A * 12/1993 Riza ..................... H04B 10/64
342/368
8,184,988 B2 5/2012 Chen et al.
(Continued)

FOREIGN PATENT DOCUMENTS

CN 103454542 A 12/2013
CN 103715480 A 4/2014
(Continued)

OTHER PUBLICATIONS

Pan, "Tunable and wideband microwave photonic phase shifter based on a single sideband polarization modulator and a polarizer", Nov. 1, 2012, OSA, Optical Letters, vol. 37, No. 21, pp. 4483-4485 (Year: 2012).*
(Continued)

*Primary Examiner* — Darren E Wolf
(74) *Attorney, Agent, or Firm* — Mei & Mark LLP; Manni Li

(57) ABSTRACT

Microwave photonic vector network analyzer and a method for measuring scattering parameters of a microwave device are provided. The analyzer comprises a microwave source, wherein a signal loading module, an optical sampling module and a signal processing module are sequentially arranged along a signal output direction of the microwave source; an output end of the signal processing module is respectively connected with a control end of the microwave source and a control end of the optical sampling module; and two test ports of the signal loading module are connected with both ends of a device to be tested. The invention realizes direct sampling and frequency conversion for microwave signals, abandons a superheterodyne structure and/or direct frequency conversion structure in the traditional network analyzer, simplifies the structure of the system while improving the measurement frequency range and avoiding image interference, and reduces system complexity, cost and power consumption.

5 Claims, 3 Drawing Sheets

(51) Int. Cl.
  *H04B 10/64* (2013.01)
  *H04B 10/40* (2013.01)
  *H04B 10/60* (2013.01)
  *H04B 10/50* (2013.01)
  *H04B 10/07* (2013.01)
  *H04B 17/30* (2015.01)

(52) U.S. Cl.
  CPC .............. *H04B 10/07* (2013.01); *H04B 10/40* (2013.01); *H04B 10/50* (2013.01); *H04B 10/60* (2013.01); *H04B 17/30* (2015.01)

(56) References Cited

U.S. PATENT DOCUMENTS

| 2010/0008680 A1* | 1/2010 | Chen | H04B 10/548 |
| --- | --- | --- | --- |
| | | | 398/198 |
| 2012/0301153 A1* | 11/2012 | Takeguchi | G02F 1/225 |
| | | | 398/135 |
| 2016/0269122 A1 | 9/2016 | Yu et al. | |

FOREIGN PATENT DOCUMENTS

| CN | 104363047 A | 2/2015 |
| --- | --- | --- |
| CN | 105547654 A | 5/2016 |
| CN | 107132027 A | 9/2017 |

OTHER PUBLICATIONS

Mirabbasi S et al., "Classical and modern receiver architectures," J. Communications Magazine IEEE, 38(11):132-139 (2000).
Pan et al., "Photonics-Based Broadband Microwave Measurement," J. Journal of Lightwave Technology, 35 (16):3498-3513 (2017).
Qi, C., et al., "Microwave photonic filter," J. Journal of Beijing Jiaotong University, 33(3):83-87 (2009).
Su, F., et al., "Effects of the photonic sampling pulse width and the photodetection bandwidth on the channel response of photonic ADCs," J. Optics Express, 24(2):924 (2016).
Frankel M. Y., et al., "Ultrahigh-bandwidth vector network analyzer based on external electro-optic sampling," J. Solid-State Electronics, 35(3):325-332 (1992).

* cited by examiner

MICROWAVE PHOTONIC VECTOR NETWORK ANALYZER AND METHOD FOR MEASURING SCATTERING PARAMETERS OF MICROWAVE DEVICE

CROSS-REFERENCE TO RELATED APPLICATIONS

The subject application is a continuation-in-part of PCT/CN2018/114490 filed on Nov. 8, 2018, which in turn claims priority on Chinese Application No. 201810407639.X filed on May 2, 2018 in China. The contents and subject matter of the PCT international application and the Chinese priority application are incorporated herein by reference.

TECHNICAL FIELD

The present invention relates to optical information processing technology, particularly, microwave photonic vector network analyzer and method for measuring scattering parameters of a microwave device.

BACKGROUND ART

A vector network analyzer is a basic tester in the fields of electronics and communication. It is mainly used to measure scattering parameters of a microwave port network, that is, S parameters. Modern microwave vector network analyzers are greatly improved in many aspects. However, due to the limited bandwidth of an amplitude and phase receiver, high-frequency signals cannot be directly obtained. When microwave devices are measured, heterodyne and/or direct frequency conversion are generally used to receive the high-frequency signals. The heterodyne mode for reception adopts a frequency mixing principle. In order to achieve image rejection, local oscillator isolation, and high sensitivity reception, it is necessary to adopt a multi-stage frequency mixing structure, a filter with good frequency selection characteristics and a phase-locked unit. A large number of separated elements with complex architecture reduce integration, resulting in a significant increase in price, size, weight, and power consumption. A direct frequency conversion technology directly converts the received signals into baseband signals, thereby omitting an image rejection filter and an intermediate frequency filter and reducing the volume and power consumption of the system. However, I/Q balance, LO leakage, DC offset, in-band harmonics, 1/f noise, and other problems are introduced (see Mirabbasi S et al., "Classical and modern receiver architectures," J. Communications Magazine IEEE, 2000, 38(11):132-139.)

Photonic devices have the advantages of large bandwidth, high precision, and low jitter compared with electronic devices. A microwave photonic technology combines the advantages of photonics and electronics, has great potential to break through the "electronic bottleneck" of the traditional microwave measurement and signal processing, and arouses wide concern. At present, various photonics-based microwave measurement and signal processing solutions have been proposed, such as microwave passive direction finding (Pan et al., "Photonics-Based Broadband Microwave Measurement," J. Journal of Lightwave Technology, 2017, 35 (16):3498-3513), microwave photonic filter (Qi, C., et al., "Microwave photonic filter," J. Journal of Beijing Jiaotong University, 2009, 33(3):83-87), optical analog-to-digital conversion (Su, F., et al., "Effects of the photonic sampling pulse width and the photodetection bandwidth on the channel response of photonic ADCs," J. Optics Express, 2016, 24(2):924), etc. Frankel M. Y., et al. proposed an ultrahigh-bandwidth vector network analyzer based on external electro-optic sampling (Frankel M. Y., et al., "Ultrahigh-bandwidth vector network analyzer based on external electro-optic sampling," J. Solid-State Electronics, 1992, 35(3):325-332). A femtosecond optical pulse is used to control a ps-level electric pulse generated by a high-speed photoconductive switch as an excitation signal; the impulse response of a tested microwave device is obtained by time-domain electro-optic sampling; and a frequency domain characteristic is obtained by Fourier transform. However, the Fourier transform required in this method is computationally complex and its accuracy is affected by a window function, which limits its application in high-precision measurement.

SUMMARY OF THE INVENTION

In view of the defects in the current technology, the present invention provides a microwave photonic vector network analyzer and a method for measuring scattering parameters of a microwave device. The analyzer of the present invention uses an optical sampling technology to realize direct sampling and frequency conversion for microwave signals, abandons a superheterodyne structure and/or direct frequency conversion structure in the traditional network analyzer, simplifies the structure of the system while improving the measurement frequency range and avoiding image interference, and reduces system complexity, cost, and power consumption.

The technical solution of the present invention is as follows:

a microwave photonic vector network analyzer comprises a microwave source, wherein a signal loading module, an optical sampling module and a signal processing module are sequentially arranged along a signal output direction of the microwave source; an output end of the signal processing module is respectively connected with a control end of the microwave source and a control end of the optical sampling module; and two test ports of the signal loading module are connected with both ends of a device to be tested.

The microwave photonic vector network analyzer of the present invention has two specific structures. The first specific structure of the microwave photonic vector network analyzer is as follows: the signal loading module comprises a power splitter, a microwave switch, a first directional coupler and a second directional coupler; and the optical sampling module comprises an optical pulse sequence generator, an optical coupler, a reference branch modulator, a first test branch modulator, a second test branch modulator, a photoelectric detection module, an electrical analog-to-digital conversion module and a synchronization module;

an input end of the power splitter is connected with an output end of the microwave source; the power splitter has two output ends: one output end is connected with an input end of the microwave switch; the microwave switch is divided into two output ends: the ① output end is connected with an input end of the first directional coupler; one output end of the first directional coupler is a test port I of the signal loading module, and is connected with one end of the microwave device to be tested; the other output end of the first directional coupler is connected with a radio frequency input end of the first test branch modulator; the ② output end of the microwave switch is connected with an input end of the second directional coupler; one output end of the second directional coupler is a test port II of the signal loading module, and is connected with the other end of the microwave device to be tested; the other output end of the second directional coupler is connected with a radio frequency input end of the second test branch modulator; and the other output end of the power splitter is connected with a radio frequency input port of the reference branch modulator;

the output end of the optical pulse sequence generator is connected with the input end of the optical coupler; three output ends of the optical coupler are respectively connected with the input ends of the reference branch modulator, the first test branch modulator, and the second test branch modulator; the output ends of the three modulators are respectively connected with the input end of one photoelectric detection device in the photoelectric detection module; each photoelectric detection device in the photoelectric detection module is connected with one electrical analog-to-digital converter in the electrical analog-to-digital conversion module; the output ends of three electrical analog-to-digital converters are connected with the input end of the signal processing module; two output ends of the signal processing module are respectively connected with a control end of the optical pulse sequence generator and a control end of the microwave source, so that the optical pulse sequence generator generates a periodic optical pulse sequence; the Fourier bandwidth of a time domain shape of a single optical pulse is greater than a measured microwave frequency range; the period of the optical pulse sequence is configured by the signal processing module so that the repetition frequency of the optical pulse sequence is not an integer multiple of the frequency of the output signal of the microwave source; and the synchronization module is respectively connected with the optical pulse sequence generator and the electrical analog-to-digital conversion module to synchronize the optical pulse sequence generator and the electrical analog-to-digital conversion module to ensure that the sampling rate of the electrical analog-to-digital conversion module is the same as the repetition frequency of the output pulse sequence of the optical pulse sequence generator.

The second specific structure of the microwave photonic vector network analyzer is as follows:

the signal loading module comprises a microwave switch, a first power splitter, a first directional coupler, a second power splitter and a second directional coupler; and the optical sampling module comprises an optical pulse sequence generator, an optical coupler, a first reference branch modulator, a first test branch modulator, a second test branch modulator, a second reference branch modulator, a photoelectric detection module, an electrical analog-to-digital conversion module and a synchronization module;

an input end of the microwave switch is connected with a microwave output end of the microwave source; the microwave switch is divided into two output ends: the ① output end is connected with an input end of the first power splitter; the output of the first power splitter is divided into two paths: one path of output is connected with the input end of the first directional coupler; one output end of the first directional coupler is a test port I of the signal loading module, and is connected with one end of the microwave device to be tested; the other output end of the first directional coupler is connected with a radio frequency input end of the first test branch modulator; the other path of output end of the first power splitter is connected with the radio frequency input end of the first reference branch modulator; the ② output end of the microwave switch is connected with an input end of the second power splitter; the output of the second power splitter is divided into two paths: one path of output is connected with the input end of the second directional coupler; one output end of the second directional coupler is a test port II of the signal loading module, and is connected with the other end of the microwave device to be tested; the other path of output end of the second directional coupler is connected with a radio frequency input end of the second test branch modulator; the other output end of the second power splitter is connected with a radio frequency input end of the second reference branch modulator;

the optical pulse sequence generator is connected with the input end of the optical coupler; the optical coupler is divided into four output ends which are respectively connected with the input ends of the first reference branch modulator, the first test branch modulator, the second test branch modulator and the second reference branch modulator; the output ends of the four modulators are respectively connected with the input end of one photoelectric detection device in the photoelectric detection module; each photoelectric detection device in the photoelectric detection module is connected with one electrical analog-to-digital converter in the electrical analog-to-digital conversion module; the output ends of the electrical analog-to-digital converters are connected with the signal processing module; the signal processing module is connected with a control end of the microwave source and a control end of the optical pulse sequence generator; under the control of the signal processing module, the optical pulse sequence generator generates a periodic optical pulse sequence; the Fourier bandwidth of a time domain shape of a single optical pulse is greater than a measured microwave frequency range; the period of the optical pulse sequence is configured by the signal processing module so that the repetition frequency of the optical pulse sequence is not an integer multiple of the frequency of the output signal of the microwave source; and the synchronization module is respectively connected with the optical pulse sequence generator and the electrical analog-to-digital conversion module to synchronize the optical pulse sequence generator and the electrical analog-to-digital conversion module to ensure that the sampling rate of the electrical analog-to-digital conversion module is the same as the repetition frequency of the output pulse sequence of the optical pulse sequence generator.

The method for testing scattering parameters of a microwave device using the first microwave photonic vector network analyzers of the present invention comprises the following steps:

(1) setting a test frequency range from $f_M$ to $f_N$, and a resolution as $\Delta f$; and making $f_i=f_M$;

(2) connecting two ports of the microwave device to be tested respectively between the test port I and the test port II of the signal loading module;

(3) instructing, by the signal processing module, the microwave source to generate a single frequency signal of frequency $f_i$, wherein the single frequency signal is divided into two paths by the power splitter: one path is inputted into the radio frequency input port of the reference branch modulator of the optical sampling module, and the other path is loaded to the input end of the microwave switch;

(4) switching the microwave switch to the ① output end; loading the input signal to a port of the microwave device to be tested through the first directional coupler; inputting a signal that penetrates through the microwave device to be tested into the radio frequency input port of the second test branch modulator through the second directional coupler; and inputting a signal reflected by the microwave device to be tested into the radio frequency input port of the first test branch modulator through the first directional coupler;

(5) dividing, by the optical coupler, an optical pulse sequence outputted by the optical pulse sequence generator into three paths which serve as sampling pulse sequences of a reference branch, a first test branch and a second test branch; directly sampling, by the reference branch signal modulator, a microwave signal outputted by the power splitter; sampling, by the first test branch modulator and the second test branch modulator, the signals reflected and transmitted by the device to be tested; and transmitting corresponding digital sampling results obtained from three paths of sampling signals by the photoelectric detection module and the electrical analog-to-digital conversion module into the signal processing module;

(6) calculating, by the signal processing module, the signal amplitude $A_{11}$ of the first test branch and a phase difference $\theta_{11}$ between a first test branch signal and a reference branch signal to obtain the S11 parameter of the microwave device to be tested at the frequency point: $A_{11}\exp(j\theta_{11})$, wherein j is an imaginary unit;

(7) calculating, by the signal processing module, the amplitude $A_{21}$ of a second test branch signal and a phase difference $\theta_{21}$ between the second test branch signal and the reference branch signal to obtain the S21 parameter of the microwave device to be tested at the frequency point, wherein the parameter can be represented as $A_{21}\exp(j\theta_{21})$, wherein j is an imaginary unit;

(8) switching the microwave switch to the ② output end; loading the input signal to the other port of the microwave device to be tested through the second directional coupler; inputting a signal that penetrates through the microwave device to be tested into the radio frequency input port of the first test branch modulator through the first directional coupler; and inputting a signal reflected by the microwave device to be tested into the radio frequency input port of the second test branch modulator through the second directional coupler;

(9) dividing, by the optical coupler, an optical pulse sequence outputted by the optical pulse sequence generator into three paths which serve as sampling pulse sequences of a reference branch, a first test branch and a second test branch; directly sampling, by the reference branch signal modulator, a microwave signal outputted by the power splitter; sampling, by the first test branch modulator and the second test branch modulator, the signals transmitted and reflected by the device to be tested; and transmitting corresponding digital sampling results obtained from three paths of sampling signals by the photoelectric detection module and the electrical analog-to-digital conversion module into the signal processing module;

(10) calculating, by the signal processing module, the signal amplitude $A_{12}$ of the first test branch and a phase difference $\theta_{12}$ between a first test branch signal and a reference branch signal to obtain the S12 parameter of the microwave device to be tested at the frequency point, wherein the parameter can be represented as $A_{12}\exp(j\theta_{12})$, wherein j is an imaginary unit;

(11) calculating, by the signal processing module, the amplitude $A_{22}$ of a second test branch signal and a phase difference $\theta_{22}$ between the second test branch signal and the reference branch signal to obtain the S22 parameter of the microwave device to be tested at the frequency point, wherein the parameter can be represented as $A_{22}\exp(j\theta_{22})$, wherein j is an imaginary unit;

(12) making $f_i=f_i+\Delta f$; returning to step 3) if $f_i \leq f_N$; otherwise, entering a next step; and

(13) calibrating the measured S11, S12, S21 and S22 according to known calibration parameters and corresponding calibration methods.

The method for testing scattering parameters of a microwave device using the second microwave photonic vector network analyzers of the present invention comprises the following steps:

(1) setting a test frequency range from $f_M$ to $f_N$, and a resolution as $\Delta f$; and making $f_i=f_M$;

(2) connecting two ports of the microwave device to be tested between the test port I and the test port II of the signal loading module;

(3) instructing, by the signal processing module, the microwave source to generate a single frequency signal of frequency $f_i$, and transmitting the signal into the microwave switch;

(4) switching the microwave switch to the ① side; dividing the single frequency signal into two paths by the first power splitter, wherein one path is inputted into the radio frequency input port of the first reference branch modulator of the optical sampling module, and the other path is loaded to the first directional coupler;

(5) loading the input signal to a port of the microwave device to be tested through the first directional coupler; inputting a signal that penetrates through the microwave device to be tested into the radio frequency input port of the second test branch modulator of the optical sampling module; and inputting a signal reflected by the microwave device to be tested into the radio frequency input port of the first test branch modulator of the optical sampling module through the first directional coupler;

(6) dividing, by the optical coupler, an optical pulse sequence outputted by the optical pulse sequence generator into four paths which serve as sampling pulse sequences of a first reference branch, a first test branch, a second test branch and a second reference branch; directly sampling, by the reference branch modulator, a microwave signal outputted by the first power splitter; sampling, by the first test branch modulator and the second test branch modulator, the signals reflected and transmitted by the device to be tested; and transmitting corresponding digital sampling results obtained from three paths of sampling signals by the photoelectric detection module and the electrical analog-to-digital conversion module into the signal processing module;

(7) calculating, by the signal processing module, the amplitude $A_{11}$ of a first test branch signal and a phase difference $\theta_{11}$ between the first test branch signal and a first reference branch signal to obtain the S11 parameter of the microwave device to be tested at the frequency point, wherein the parameter can be represented as $A_{11}\exp(j\theta_{11})$, wherein j is an imaginary unit;

(8) calculating, by the signal processing module, the amplitude $A_{21}$ of a second test branch signal and a phase difference $\theta_{21}$ between the second test branch signal and the first reference branch signal to obtain the S21 parameter of the microwave device to be tested at the frequency point, wherein the parameter can be represented as $A_{21}\exp(j\theta_{21})$, wherein j is an imaginary unit;

(9) switching the microwave switch to the ② side; dividing the single frequency signal into two paths by the second power splitter, wherein one path is inputted into the radio frequency input port of the second reference branch modulator of the optical sampling module, and the other path is loaded to the second directional coupler;

loading the input signal to a port of the microwave device to be tested through the second directional coupler; inputting a signal that penetrates through the microwave device to be tested into the radio frequency input port of the first test branch modulator of the optical sampling module; and inputting a signal reflected by the microwave device to be tested into the radio frequency input port of the second test branch modulator of the optical sampling module through the second directional coupler;

(10) dividing, by the optical coupler, an optical pulse sequence outputted by the optical pulse sequence generator into four paths which serve as sampling pulse sequences of a first reference branch, a first test branch, a second test branch and a second reference branch; directly sampling, by the second reference branch modulator, a microwave signal outputted by the second power splitter; sampling, by the first test branch modulator and the second test branch modulator, the signals transmitted and reflected by the device to be tested; and transmitting corresponding digital sampling results obtained from three paths of sampling signals by the photoelectric detection module and the electrical analog-to-digital conversion module into the signal processing module;

(11) calculating, by the signal processing module, the amplitude $A_{12}$ of a first test branch signal and a phase difference $\theta_{12}$ between the first test branch signal and a second reference branch signal to obtain the S12 parameter of the microwave device to be tested at the frequency point, wherein the parameter can be represented as $A_{12}\exp(j\theta_{12})$, wherein j is an imaginary unit;

(12) calculating, by the signal processing module, the amplitude $A_{22}$ of a second test branch signal and a phase difference $\theta_{22}$ between the second test branch signal and the second reference branch signal to obtain the S22 parameter of the microwave device to be tested at the frequency point, wherein the parameter can be represented as $A_{22}\exp(j\theta_{22})$, wherein j is an imaginary unit;

(13) making $f_i = f_i + \alpha f$; returning to step 3) if $f_i \leq f_N$; otherwise, entering a next step; and

(14) calibrating the measured S11, S12, S21 and S22 according to known calibration parameters and corresponding calibration methods.

Compared with the prior art, the present invention has the following advantages:

(1) The present invention uses a photonic sampling technology to receive the signals without superheterodyne structure and/or direct frequency conversion structure, abandons a frequency mixer, a phase-locked loop and a filter, effectively reduces the complexity, size, quality and power consumption of the system, increases system bandwidth, expands the test frequency range, and avoids the problems of image rejection, I/Q balance, LO leakage, and DC offset.

(2) The present invention uses a mature commercial optoelectronic device, and has the characteristics of low cost, relatively simple implementation and easy integration.

DETAILED DESCRIPTION OF THE INVENTION

Two examples of the present invention are provided below in conjunction with FIGS. 2 and 3. The examples are implemented on the premise of the technical solution of the present invention, and detailed embodiments and processes are given, but the protection scope of the present invention is not limited to the following examples.

Example 1

Figure 1:
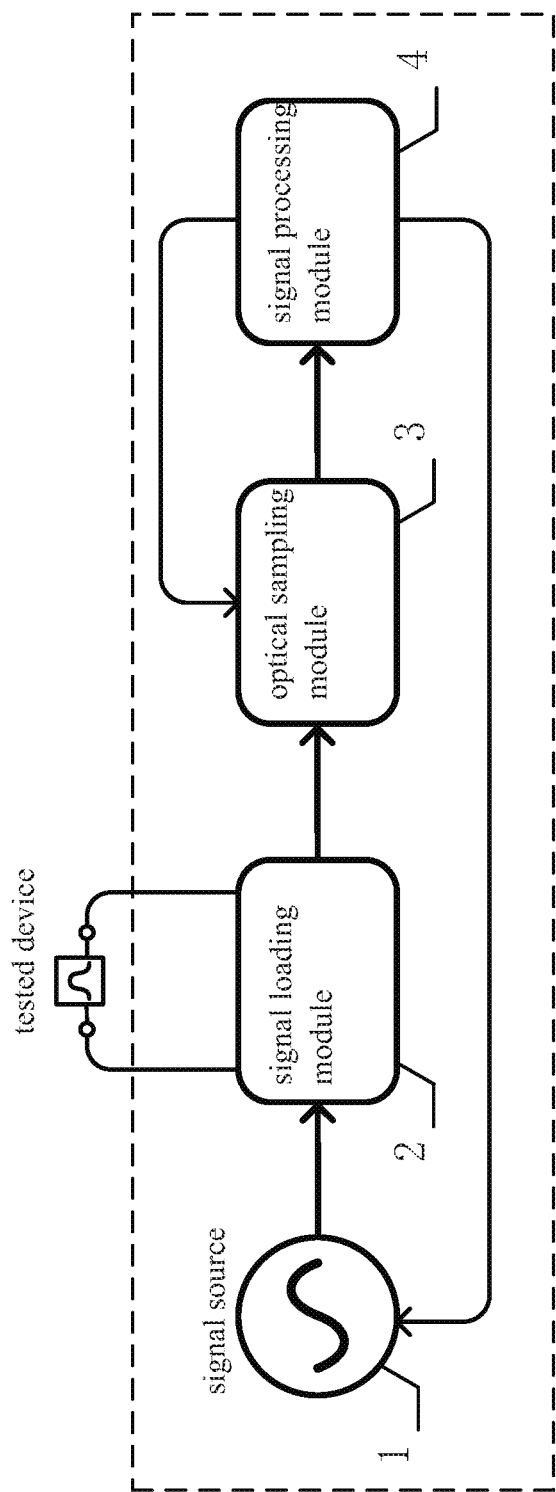
FIG. 1 is a structural schematic diagram showing the microwave photonic vector network analyzer of the present invention.
Figure 2:
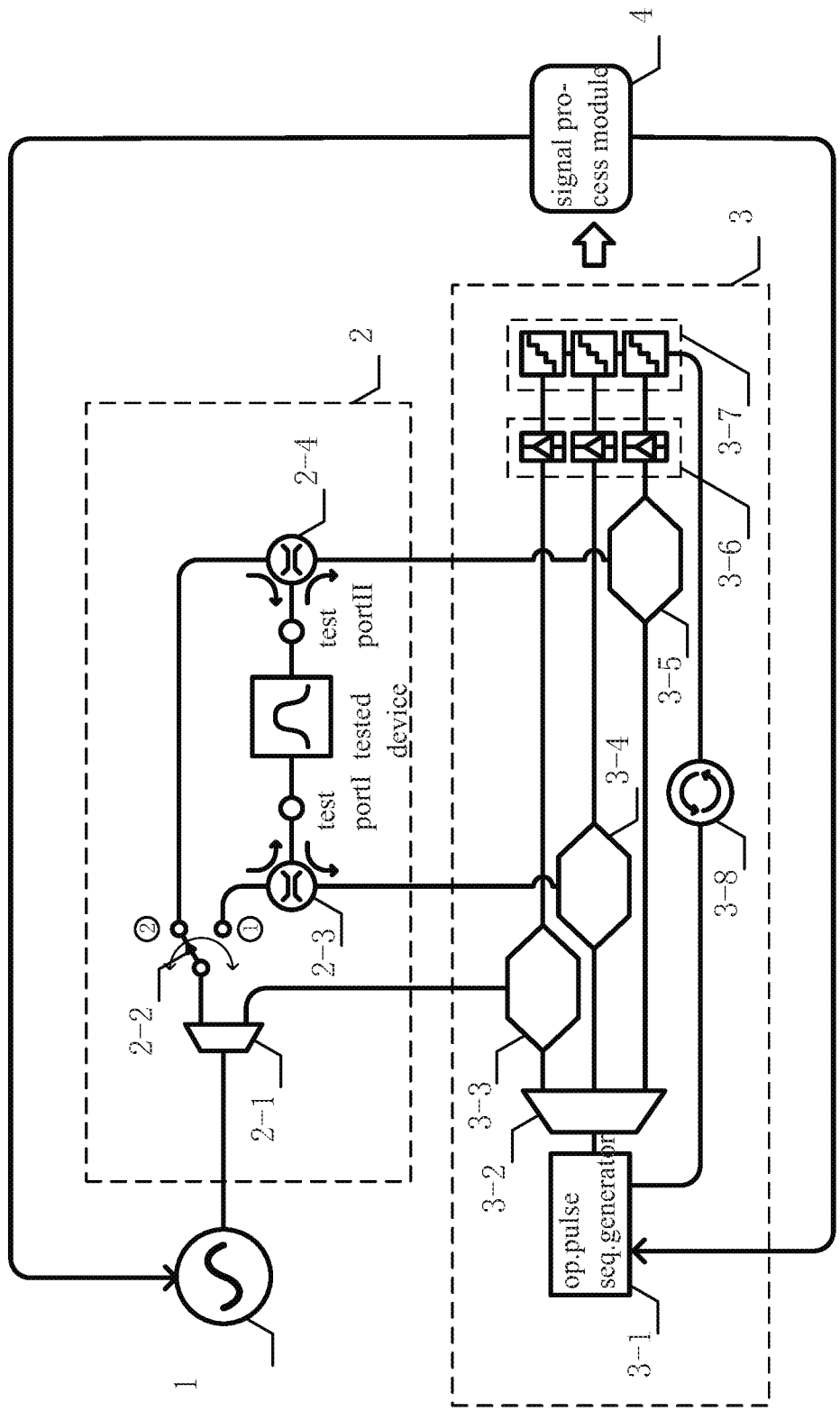
FIG. 2 is a structural schematic diagram showing Example 1 of the microwave photonic vector network analyzer of the present invention.

As shown in FIG. 2, the microwave photonic vector network analyzer of the present invention is a microwave photonic vector network analyzer that comprises a microwave source 1, wherein a signal loading module 2, an optical sampling module 3, and a signal processing module 4 are sequentially arranged along a signal output direction of the microwave source 1; an output end of the signal processing module 4 is respectively connected with a control end of the microwave source 1 and a control end of the optical sampling module 3; and two test ports of the signal loading module 2 are connected with both ends of a device to be tested.

The signal loading module 2 comprises a power splitter 2-1, a microwave switch 2-2, a first directional coupler 2-3 and a second directional coupler 2-4; and the optical sampling module 3 comprises an optical pulse sequence generator 3-1, an optical coupler 3-2, a reference branch modulator 3-3, a first test branch modulator 3-4, a second test branch modulator 3-5, a photoelectric detection module 3-6, an electrical analog-to-digital conversion module 3-7 and a synchronization module 3-8.

An input end of the power splitter 2-1 is connected with an output end of the microwave source 1; the power splitter 2-1 has two output ends: one output end is connected with an input end of the microwave switch 2-2; the microwave switch 2-2 is divided into two output ends (①②): the ① output end is connected with an input end of the first directional coupler 2-3; one output end of the first directional coupler 2-3 is a test port I of the signal loading module 2, and is connected with one end of the microwave device to be tested; the other output end of the first directional coupler 2-3 is connected with a radio frequency input end of the first test branch modulator 3-4; the ② output end of the microwave switch 2-2 is connected with an input end of the second directional coupler 2-4; one output end of the second directional coupler 2-4 is a test port II of the signal loading module 2, and is connected with the other end of the microwave device to be tested; the other output end of the second directional coupler 2-4 is connected with a radio frequency input end of the second test branch modulator 3-5; the other output end of the power splitter 2-1 is connected with a radio frequency input port of the reference branch modulator 3-3.

The output end of the optical pulse sequence generator 3-1 is connected with the input end of the optical coupler 3-2; three output ends of the optical coupler 3-2 are respectively connected with the input ends of the reference branch modulator 3-3, the first test branch modulator 3-4, and the second test branch modulator 3-5; the output ends of the three modulators are respectively connected with the input end of one photoelectric detection device in the photoelectric detection module 3-6; each photoelectric detection device in the photoelectric detection module 3-6 is connected with one electrical analog-to-digital converter in the electrical analog-to-digital conversion module 3-7; the output ends of three electrical analog-to-digital converters are connected with the input end of the signal processing module 4; two output ends of the signal processing module 4 are respectively connected with a control end of the optical pulse sequence generator 3-1 and a control end of the microwave source 1, so that the optical pulse sequence generator 3-1 generates a periodic optical pulse sequence; the Fourier bandwidth of a time domain shape of a single optical pulse is greater than a measured microwave frequency range; the period of the optical pulse sequence is configured by the signal processing module 4 so that the repetition frequency of the optical pulse sequence is not an integer multiple of the frequency of the output signal of the microwave source 1; and the synchronization module 3-8 is respectively connected with the optical pulse sequence generator 3-1 and the electrical analog-to-digital conversion module 3-7 to synchronize the optical pulse sequence generator 3-1 and the electrical analog-to-digital conversion module 3-7 to ensure that the sampling rate of the electrical analog-to-digital conversion module 3-7 is the same as the repetition frequency of the output pulse sequence of the optical pulse sequence generator 3-1.

The testing process in the present example comprises the following steps:

(1) setting a test frequency range from $f_M$ to $f_N$, and a resolution as $\Delta f$; and making $f_i = f_M$;

(2) connecting two ports of the microwave device to be tested between the test port I and the test port II of the signal loading module 2;

(3) instructing, by the signal processing module 4, the microwave source 1 to generate a single frequency signal of frequency $f_i$, wherein the single frequency signal is divided into two paths by the power splitter 2-1: one path is inputted into the radio frequency input port of the reference branch modulator 3-3 of the optical sampling module 3, and the other path is loaded to the input end of the microwave switch 2-2;

(4) switching the microwave switch 2-2 to the ① output end; loading the input signal to a port of the microwave device to be tested through the first directional coupler 2-3; inputting a signal that penetrates through the microwave device to be tested into the radio frequency input port of the second test branch modulator 3-5 through the second directional coupler 2-4; and inputting a signal reflected by the microwave device to be tested into the radio frequency input port of the first test branch modulator 3-4 through the first directional coupler 2-3;

(5) dividing, by the optical coupler 3-2, an optical pulse sequence outputted by the optical pulse sequence generator 3-1 into three paths which serve as sampling pulse sequences of a reference branch, a first test branch and a second test branch; directly sampling, by the reference branch signal modulator 3-3, a microwave signal outputted by the power splitter 2-1; sampling, by the first test branch modulator 3-4 and the second test branch modulator 3-5, the signals reflected and transmitted by the device to be tested; and transmitting corresponding digital sampling results obtained from three paths of sampling signals by the photoelectric detection module 3-6 and the electrical analog-to-digital conversion module 3-7 into the signal processing module 4;

(6) calculating, by the signal processing module 4, the signal amplitude $A_{11}$ of the first test branch and a phase difference $\theta_{11}$ between a first test branch signal and a reference branch signal to obtain the S11 parameter of the microwave device to be tested at the frequency point: $A_{11}\exp(j\theta_{11})$, wherein j is an imaginary unit;

(7) calculating, by the signal processing module 4, the amplitude $A_{21}$ of a second test branch signal and a phase difference $\theta_{21}$ between the second test branch signal and the reference branch signal to obtain the S21 parameter of the microwave device to be tested at the frequency point, wherein the parameter can be represented as $A_{21}\exp(j\theta_{21})$, wherein j is an imaginary unit;

(8) switching the microwave switch 2-2 to the ② output end; loading the input signal to the other port of the microwave device to be tested through the second directional coupler 2-4; inputting a signal that penetrates through the microwave device to be tested into the radio frequency input port of the first test branch modulator 3-4 through the first directional coupler 2-3; and inputting a signal reflected by the microwave device to be tested into the radio frequency input port of the second test branch modulator 3-4 through the second directional coupler (2-4);

(9) dividing, by the optical coupler 3-2, an optical pulse sequence outputted by the optical pulse sequence generator 3-1 into three paths which serve as sampling pulse sequences of a reference branch, a first test branch and a second test branch; directly sampling, by the reference branch signal modulator 3-3, a microwave signal outputted by the power splitter 2-1; sampling, by the first test branch modulator 3-4 and the second test branch modulator 3-5, the signals transmitted/reflected by the device to be tested; and transmitting corresponding digital sampling results obtained from three paths of sampling signals by the photoelectric detection module 3-6 and the electrical analog-to-digital conversion module 3-7 into the signal processing module 4;

(10) calculating, by the signal processing module 4, the signal amplitude $A_{12}$ of the first test branch and a phase difference $\theta_{12}$ between a first test branch signal and a reference branch signal to obtain the S12 parameter of the microwave device to be tested at the frequency point, wherein the parameter can be represented as $A_{12}\exp(j\theta_{12})$, wherein j is an imaginary unit;

(11) calculating, by the signal processing module 4, the amplitude $A_{22}$ of a second test branch signal and a phase difference $\theta_{22}$ between the second test branch signal and the reference branch signal to obtain the S22 parameter of the microwave device to be tested at the frequency point, wherein the parameter can be represented as $A_{22}\exp(j\theta_{22})$, wherein j is an imaginary unit;

(12) making $f_i = f_i + \alpha f$; returning to step 3) if $f_i \leq f_N$; otherwise, entering a next step; and

(13) calibrating the measured S11, S12, S21 and S22 according to known calibration parameters and corresponding calibration methods.

Example 2

Figure 3:
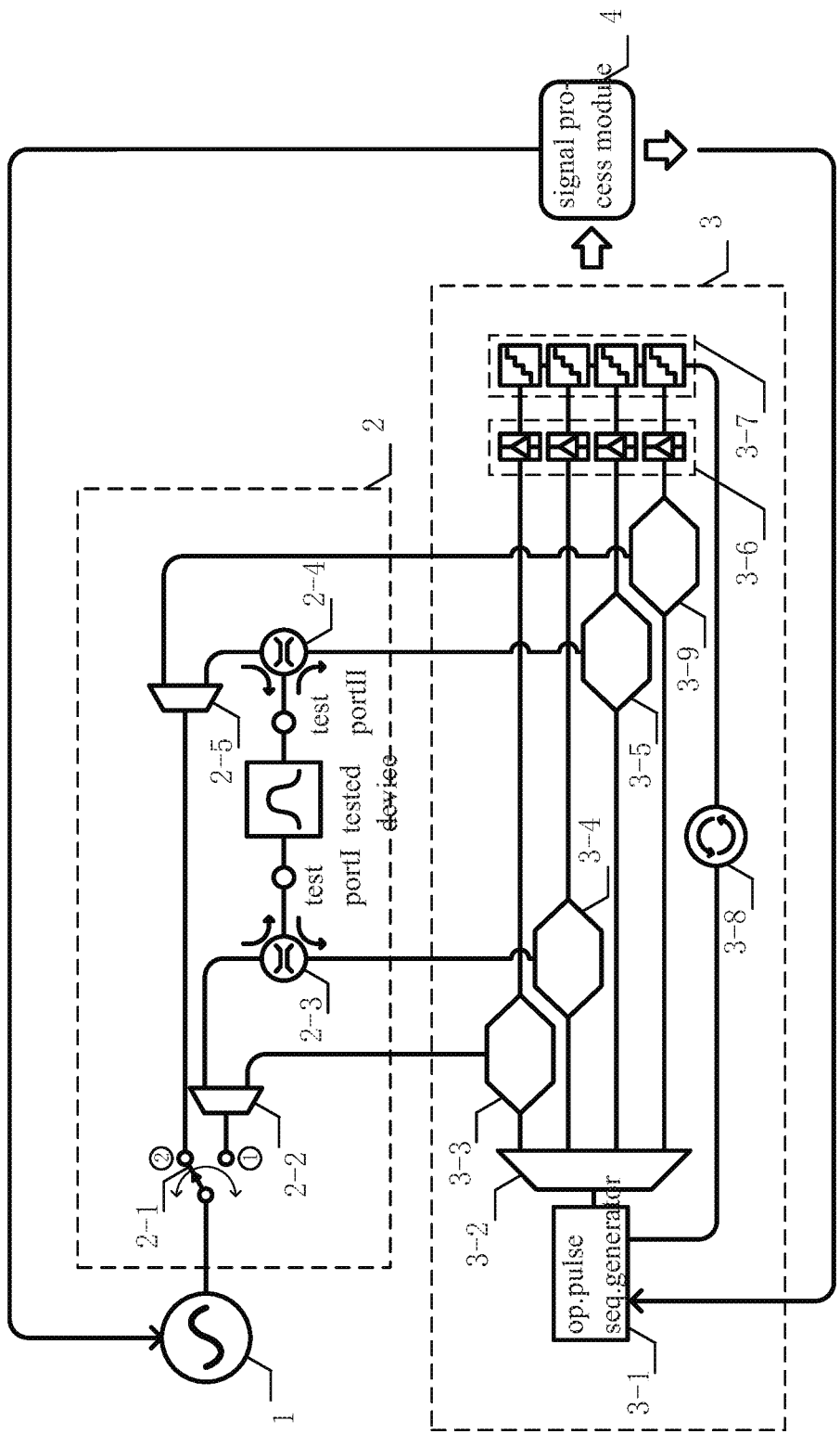
FIG. 3 is a structural schematic diagram showing Example 2 of the microwave photonic vector network analyzer of the present invention.

The system structure is shown in FIG. 3. The system sequentially comprises: a microwave source 1, a signal loading module 2, an optical sampling module 3 and a signal processing module 4, wherein the signal loading module 2 comprises: a microwave switch 2-1, a first power splitter 2-2, a first directional coupler 2-3, a second directional coupler 2-4 and a second power splitter 2-5. The optical sampling module 3 comprises: optical pulse sequence generator 3-1, an optical coupler 3-2, a first reference branch modulator 3-3, a first test branch modulator 3-4, a second test branch modulator 3-5, a second reference branch modulator 3-9, a photoelectric detection module 3-6, an electrical analog-to-digital conversion module 3-7 and a synchronization module 3-8.

The testing process in the present example comprises the following steps:

(1) setting a test frequency range from $f_M$ to $f_N$, and a resolution as $\Delta f$; and making $f_i = f_M$;

(2) connecting two ports of the microwave device to be tested between the test port I and the test port II of the signal loading module 2;

(3) instructing, by the signal processing module 4, the microwave source 1 to generate a single frequency signal of frequency $f_i$, and transmitting the signal into the microwave switch 2-1;

(4) switching the microwave switch 2-1 to the ① side; dividing the single frequency signal into two paths by the first power splitter 2-2, wherein one path is inputted into the radio frequency input port of the first reference branch modulator 3-3 of the optical sampling module 3, and the other path is loaded to the first directional coupler 2-3;

(5) loading the input signal to a port of the microwave device to be tested through the first directional coupler 2-3; inputting a signal that penetrates through the microwave device to be tested into the radio frequency input port of the second test branch modulator 3-5 of the optical sampling module 3; and inputting a signal reflected by the microwave device to be tested into the radio frequency input port of the second test branch modulator 3-4 of the optical sampling module 3 through the first directional coupler 2-3;

(6) dividing, by the optical coupler 3-2, an optical pulse sequence outputted by the optical pulse sequence generator 3-1 into four paths which serve as sampling pulse sequences of a first reference branch, a first test branch, a second test branch and a second reference branch; directly sampling, by the first reference branch modulator 3-3, a microwave signal outputted by the first power splitter 2-2; sampling, by the first test branch modulator 3-4 and the second test branch modulator 3-5, the signals reflected and transmitted by the device to be tested; and transmitting corresponding digital sampling results obtained from three paths of sampling signals by the photoelectric detection module (3-6) and the electrical analog-to-digital conversion module (3-7) into the signal processing module (4);

(7) calculating, by the signal processing module 4, the amplitude $\theta_{11}$ of a first test branch signal and a phase difference $\theta_{11}$ between the first test branch signal and a first reference branch signal to obtain the S11 parameter of the microwave device to be tested at the frequency point, wherein the parameter can be represented as $A_{11}\exp(j\theta_{11})$, wherein j is an imaginary unit;

(8) calculating, by the signal processing module 4, the amplitude $A_{21}$ of a second test branch signal and a phase difference $\theta_{21}$ between the second test branch signal and the first reference branch signal to obtain the S21 parameter of the microwave device to be tested at the frequency point, wherein the parameter can be represented as $A_{21}\exp(j\theta_{21})$, wherein j is an imaginary unit;

(9) switching the microwave switch 2-1 to the ② side; dividing the single frequency signal into two paths by the second power splitter 2-5, wherein one path is inputted into the radio frequency input port of the second reference branch modulator 3-9 of the optical sampling module 3, and the other path is loaded to the second directional coupler 2-4;

loading the input signal to a port of the microwave device to be tested through the second directional coupler 2-4; inputting a signal that penetrates through the microwave device to be tested into the radio frequency input port of the first test branch modulator 3-4 of the optical sampling module; and inputting a signal reflected by the microwave device to be tested into the radio frequency input port of the second test branch modulator 3-5 of the optical sampling module through the second directional coupler 2-4;

(10) dividing, by the optical coupler 3-2, an optical pulse sequence outputted by the optical pulse sequence generator 3-1 into four paths which serve as sampling pulse sequences of a first reference branch, a first test branch, a second test branch and a second reference branch; directly sampling, by the second reference branch modulator 3-6, a microwave signal outputted by the second power splitter 2-4; sampling, by the first test branch modulator 3-4 and the second test branch modulator 3-5, the signals transmitted and reflected by the device to be tested; and transmitting corresponding digital sampling results obtained from three paths of sampling signals by the photoelectric detection module 3-6 and the electrical analog-to-digital conversion module 3-7 into the signal processing module 4;

(11) calculating, by the signal processing module 4, the amplitude $A_{12}$ of a first test branch signal and a phase difference $\theta_{12}$ between the first test branch signal and a second reference branch signal to obtain the S12 parameter of the microwave device to be tested at the frequency point, wherein the parameter can be represented as $A_{12}\exp(j\theta_{12})$, wherein j is an imaginary unit;

(12) calculating, by the signal processing module 4, the amplitude $A_{22}$ of a second test branch signal and a phase difference $\theta_{22}$ between the second test branch signal and the second reference branch signal to obtain the S22 parameter of the microwave device to be tested at the frequency point, wherein the parameter can be represented as $A_{22}\exp(j\theta_{22})$, wherein j is an imaginary unit;

(13) making $f_i=f_i+\Delta f$; returning to step 3) if $f_i \le f_N$; otherwise, entering a next step; and

(14) calibrating the measured S11, S12, S21 and S22 according to known calibration parameters and corresponding calibration methods.

Experiment shows that, the present invention uses a photonic sampling technology to receive the signals without superheterodyne structure and/or direct frequency conversion structure, abandons a frequency mixer, a phase-locked loop and a filter, effectively reduces the complexity, size, quality and power consumption of the system, increases system bandwidth, expands the test frequency range, and avoids the problems of image rejection, I/Q balance, LO leakage, and DC offset. The present invention has the characteristics of low cost, relatively simple implementation and easy integration.

We claim:

1. A microwave photonic vector network analyzer, comprising
a microwave source (1) having a signal output direction, an output end, and a control end,
a signal loading module (2) having two test ports I and II,
an optical sampling module (3) having a control end, and
a signal processing module (4) having an input end, a first output end, and a second output end,
wherein the signal loading module (2), the optical sampling module (3, and the signal processing module (4) are sequentially arranged along the signal output direction of the microwave source (1);
the first and second output ends of the signal processing module (4) are respectively connected with the control end of the microwave source (1) and the control end of the optical sampling module (3); and
the two test ports of the signal loading module (2) are connected with both ends of a device to be tested.

2. The microwave photonic vector network analyzer according to claim 1, wherein the signal loading module (2) further comprises
a power splitter (2-1) having an input end, a first output end, and a second output end, a microwave switch (2-2) having an input end, a first output end, and a second output end, a first directional coupler (2-3) having an input end, a first output end, and a second output end, and a second directional coupler (2-4) having an input end, a first output end, and a second output end; and wherein the optical sampling module (3) further comprises an optical pulse sequence generator (3-1) having an output end and a control end, an optical coupler (3-2) having an input end and three output ends, a reference branch modulator (3-3) having a radio frequency input port, an input end, and an output end, a first test branch modulator (3-4) having a radio frequency input end, an input end, and an output end, a second test branch modulator (3-5) having a radio frequency input end, an input end, and an output end, a photoelectric detection module (3-6) comprising multiple photoelectric detection devices, an electrical analog-to-digital conversion module (3-7) comprising multiple electrical analog-to-digital converters corresponding to the multiple photoelectric detection devices of the photoelectric detection module (3-6), and a synchronization module (3-8); and wherein the input end of the power splitter (2-1) is connected with the output end of the microwave source (1);

the first output end of the power splitter (2-1) is connected with the input end of the microwave switch (2-2);

the first output end of the microwave switch (2-2) is connected with the input end of the first directional coupler (2-3);

the first output end of the first directional coupler (2-3) is a test port I of the signal loading module (2) and is connected with one end of the microwave device to be tested;

the second output end of the first directional coupler (2-3) is connected with the radio frequency input end of the first test branch modulator (3-4);

the second output end of the microwave switch (2-2) is connected with the input end of the second directional coupler (2-4);

the first output end of the second directional coupler (2-4) is a test port II of the signal loading module (2) and is connected with another end of the microwave device to be tested;

the second output end of the second directional coupler (2-4) is connected with the radio frequency input end of the second test branch modulator (3-5);

the second output end of the power splitter (2-1) is connected with the radio frequency input port of the reference branch modulator (3-3);

the output end of the optical pulse sequence generator (3-1) is connected with the input end of the optical coupler (3-2);

the three output ends of the optical coupler (3-2) are respectively connected with the input end of the reference branch modulator (3-3), the input end of the first test branch modulator (3-4), and the input end of the second test branch modulator (3-5);

the output ends of the reference branch modulator (3-3), the first test branch modulator (3-4), and the second test branch modulator (3-5) are respectively connected with the input ends of the photoelectric detection devices in the photoelectric detection module (3-6);

each photoelectric detection device in the photoelectric detection module (3-6) is connected with one electrical analog-to-digital converter in the electrical analog-to-digital conversion module (3-7);

the output ends of three electrical analog-to-digital converters are connected with the input end of the signal processing module (4);

the first and second output ends of the signal processing module (4) are respectively connected with the control end of the optical pulse sequence generator (3-1) and the control end of the microwave source (1) so that the optical pulse sequence generator (3-1) generates a periodic optical pulse sequence, Fourier bandwidth of a time domain shape of the single optical pulse is greater than a measured microwave frequency range, and a period of the optical pulse sequence is configured by the signal processing module (4) so that a repetition frequency of the optical pulse sequence is not an integer multiple of a frequency of an output signal of the microwave source (1); and the synchronization module (3-8) is respectively connected with the optical pulse sequence generator (3-1) and the electrical analog-to-digital conversion module (3-7) to synchronize the optical pulse sequence generator (3-1) and the electrical analog-to-digital conversion module (3-7) to ensure that a sampling rate of the electrical analog-to-digital conversion module (3-7) is same as the repetition frequency of the output pulse sequence of the optical pulse sequence generator (3-1).

3. The microwave photonic vector network analyzer according to claim 1, wherein the signal loading module (2) further comprises a microwave switch (2-1) having an input end, a first output end, and a second output end, a first power splitter (2-2) having an input end and output, a first directional coupler (2-3) having an input end, a first output end, and a second output end, a second directional coupler (2-4) having an input end, a first output end, and a second output end, and a second power splitter (2-5) having an input end and output; and the optical sampling module (3) further comprises an optical pulse sequence generator (3-1) having a control end, an optical coupler (3-2) having an input end, a first reference branch modulator (3-3) having a radio frequency input end and an output end, a first test branch modulator (3-4) having a radio frequency input end and an output end, a second test branch modulator (3-5) having a radio frequency input end and an output end, a photoelectric detection module (3-6) having multiple photoelectric detection devices, an electrical analog-to-digital conversion module (3-7) having multiple electrical analog-to-digital converters, and each of the electrical analog-to-digital converters having an output end, and a synchronization module (3-8), and a second reference branch modulator (3-9) having a radio frequency input end and an output end;

wherein the output end of the microwave source (1) is an microwave output end, and the input end of the microwave switch (2-1) is connected with the microwave output end of the microwave source (1);

the first output end of the microwave switch (2-1) is connected with the input end of the first power splitter (2-2);

the output of the first power splitter (2-2) is divided into two paths: a first path of output is connected with the input end of the first directional coupler (2-3);

the first output end of the first directional coupler (2-3) is the test port I of the signal loading module (2) and is connected with one end of the microwave device to be tested;

the second output end of the first directional coupler (2-3) is connected with the radio frequency input end of the first test branch modulator (3-4);

the second path of output end of the first power splitter (2-2) is connected with the radio frequency input end of the first reference branch modulator (3-3);

the second output end of the microwave switch (2-1) is connected with the input end of the second power splitter (2-5);

the output of the second power splitter (2-5) is divided into two paths: a first path of the output is connected with the input end of the second directional coupler (2-4);

the first output end of the second directional coupler (2-4) is the test port II of the signal loading module (2) and is connected with other end of the microwave device to be tested;

the second output end of the second directional coupler (2-4) is connected with the radio frequency input end of the second test branch modulator (3-5);

the second path of the output of the second power splitter (2-5) is connected with the radio frequency input end of the second reference branch modulator (3-9);

the optical pulse sequence generator (3-1) is connected with the input end of the optical coupler (3-2);

the optical coupler (3-2) is divided into four output ends which are respectively connected with the input ends of the first reference branch modulator (3-3), the first test branch modulator (3-4), the second test branch modulator (3-5), and the second reference branch modulator (3-9);

the output ends of the first reference branch modulator (3-3), the first test branch modulator (3-4), the second test branch modulator (3-5), and the second reference branch modulator (3-9) are respectively connected with the input ends of one photoelectric detection devices in the photoelectric detection module (3-6);

each photoelectric detection device in the photoelectric detection module (3-6) is connected with one electrical analog-to-digital converter in the electrical analog-to-digital conversion module (3-7);

the output ends of the electrical analog-to-digital converters are connected with the signal processing module (4);

the signal processing module (4) is connected with the control end of the microwave source (1) and the control end of the optical pulse sequence generator (3-1);

under control of the signal processing module (4), the optical pulse sequence generator (3-1) regulates a period of an output pulse sequence;

the optical pulse sequence generator (3-1) generates a periodic optical pulse sequence;

Fourier bandwidth of a time domain shape of a single optical pulse is greater than a measured microwave frequency range;

the period of the optical pulse sequence is configured by the signal processing module (4) so that a repetition frequency of the optical pulse sequence is not an integer multiple of the frequency of an output signal of the microwave source (1); and the synchronization module (3-8) is respectively connected with the optical pulse sequence generator (3-1) and the electrical analog-to-digital conversion module (3-7) to synchronize the optical pulse sequence generator (3-1) and the electrical analog-to-digital conversion module (3-7) to ensure that a sampling rate of the electrical analog-to-digital conversion module (3-7) is same as the repetition frequency of the output pulse sequence of the optical pulse sequence generator (3-1).

4. A method for testing scattering parameters of a microwave device using the microwave photonic vector network analyzer of claim 2, comprising:

(1) setting a test frequency range from $f_M$ to $f_N$, and a resolution as $\Delta f$; and making $f_i = f_M$;

(2) connecting two ports of the microwave device to be tested between the test port I and the test port II of the signal loading module (2);

(3) instructing the microwave source (1) by the signal processing module (4) to generate a single frequency signal of frequency $f_i$, wherein the single frequency signal is divided into two paths by the power splitter (2-1): the first path is inputted into the radio frequency input port of the reference branch modulator (3-3) of the optical sampling module (3), and the second path is loaded to the input end of the microwave switch (2-2);

(4) switching the microwave switch (2-2) to the first output end; loading the input signal to a port of the microwave device to be tested through the first directional coupler (2-3); inputting a signal that penetrates through the microwave device to be tested into the radio frequency input port of the second test branch modulator (3-5) through the second directional coupler (2-4); and inputting a signal reflected by the microwave device to be tested into the radio frequency input port of the first test branch modulator (3-4) through the first directional coupler (2-3);

(5) dividing an optical pulse sequence outputted by the optical pulse sequence generator (3-1) by the optical coupler (3-2) into three paths which serve as sampling pulse sequences of a reference branch, a first test branch, and a second test branch; directly sampling, by the reference branch signal modulator (3-3), a microwave signal outputted by the power splitter (2-1);

sampling, by the first test branch modulator (3-4) and the second test branch modulator (3-5), the signals reflected and transmitted by the device to be tested; and transmitting corresponding digital sampling results obtained from three paths of sampling signals by the photoelectric detection module (3-6) and the electrical analog-to-digital conversion module (3-7) into the signal processing module (4);

(6) calculating, by the signal processing module (4), the signal amplitude All of the first test branch and a phase difference $\theta_{11}$ between a first test branch signal and a reference branch signal to obtain the S11 parameter of the microwave device to be tested at the frequency point: $A_{11}\exp(j\theta_{11})$, wherein j is an imaginary unit;

(7) calculating, by the signal processing module (4), the amplitude $A_{21}$ of a second test branch signal and a phase difference $\theta_{11}$ between the second test branch signal and the reference branch signal to obtain the S21 parameter of the microwave device to be tested at the frequency point, wherein the parameter can be represented as $A_{21}\exp(j\theta_{21})$, wherein j is an imaginary unit;

(8) switching the microwave switch (2-2) to the second output end; loading the input signal to the other port of the microwave device to be tested through the second directional coupler (2-4); inputting a signal that penetrates through the microwave device to be tested into the radio frequency input port of the first test branch modulator (3-4) through the first directional coupler (2-3); and inputting a signal reflected by the microwave device to be tested into the radio frequency input port of the second test branch modulator (3-5) through the second directional coupler (2-4);

(9) dividing, by the optical coupler (3-2), an optical pulse sequence outputted by the optical pulse sequence generator (3-1) into three paths which serve as sampling pulse sequences of a reference branch, a first test branch and a second test branch; directly sampling, by the reference branch signal modulator (3-3), a microwave signal outputted by the power splitter (2-1); sampling, by the first test branch modulator (3-4) and the second test branch modulator (3-5), the signals transmitted and reflected by the device to be tested; and transmitting corresponding digital sampling results obtained from three paths of sampling signals by the photoelectric detection module (3-6) and the electrical analog-to-digital conversion module (3-7) into the signal processing module (4);

(10) calculating, by the signal processing module (4), the signal amplitude $A_{12}$ of the first test branch and a phase difference $\theta_{12}$ between a first test branch signal and a reference branch signal to obtain the S12 parameter of the microwave device to be tested at the frequency point, wherein the parameter can be represented as $A_{12}\exp(j\theta_{12})$, wherein j is an imaginary unit;

(11) calculating, by the signal processing module (4), the amplitude $A_{22}$ of a second test branch signal and a phase difference $\theta_{22}$ between the second test branch signal and the reference branch signal to obtain the S22 parameter of the microwave device to be tested at the frequency point, wherein the parameter can be represented as $A_{22}\exp(j\theta_{22})$, wherein j is an imaginary unit;

(12) making $f_i=f_i+\Delta f$; returning to step 3) if $f_i \leq_N$; otherwise, entering a next step; and

(13) calibrating the measured S11, S12, S21 and S22 according to known calibration parameters and corresponding calibration methods.

5. The method for testing scattering parameters of a microwave device using the microwave photonic vector network analyzer of claim 3, comprising:

(1) setting a test frequency range from $f_M$ to $f_N$, and a resolution as $\Delta f$; and making $f_i=f_M$;

(2) connecting two ports of the microwave device to be tested between the test port I and the test port II of the signal loading module (2);

(3) instructing, by the signal processing module (4), the microwave source (1) to generate a single frequency signal of frequency $f_i$, and transmitting the single frequency signal into the microwave switch (2-1);

(4) switching the microwave switch (2-1) to the first side; dividing the single frequency signal into two paths by the first power splitter (2-2), wherein the first path is inputted into the radio frequency input port of the first reference branch modulator (3-3) of the optical sampling module (3), and the second path is loaded to the first directional coupler (2-3);

(5) loading the input signal to a port of the microwave device to be tested through the first directional coupler (2-3); inputting a signal that penetrates through the microwave device to be tested into the radio frequency input port of the second test branch modulator (3-5) of the optical sampling module (3); and inputting a signal reflected by the microwave device to be tested into the radio frequency input port of the second test branch modulator (3-4) of the optical sampling module (3) through the first directional coupler (2-3);

(6) dividing, by the optical coupler (3-2), an optical pulse sequence outputted by the optical pulse sequence generator (3-1) into four paths which serve as sampling pulse sequences of a first reference branch, a first test branch, a second test branch and a second reference branch; directly sampling, by the first reference branch modulator (3-3), a microwave signal outputted by the first power splitter (2-2); sampling, by the first test branch modulator (3-4) and the second test branch modulator (3-5), the signals reflected and transmitted by the device to be tested; and transmitting corresponding digital sampling results obtained from three paths of sampling signals by the photoelectric detection module (3-6) and the electrical analog-to-digital conversion module (3-7) into the signal processing module (4);

(7) calculating, by the signal processing module (4), the amplitude $A_{11}$ of a first test branch signal and a phase difference $\theta_{11}$ between the first test branch signal and a first reference branch signal to obtain the S11 parameter of the microwave device to be tested at the frequency point, wherein the parameter can be represented as $A_{11}\exp(j\theta_{11})$, wherein j is an imaginary unit;

(8) calculating, by the signal processing module (4), the amplitude $A_{21}$ of a second test branch signal and a phase difference $\theta_{21}$ between the second test branch signal and the first reference branch signal to obtain the S21 parameter of the microwave device to be tested at the frequency point, wherein the parameter can be represented as $A_{21}\exp(j\theta_{21})$, wherein j is an imaginary unit;

(9) switching the microwave switch (2-1) to the second side; dividing the single frequency signal into two paths by the second power splitter (2-5), wherein one path is inputted into the radio frequency input port of the second reference branch modulator (3-9) of the optical sampling module (3), and the other path is loaded to the second directional coupler (2-4);

loading the input signal to a port of the microwave device to be tested through the second directional coupler 2-4; inputting a signal that penetrates through the microwave device to be tested into the radio frequency input port of the first test branch modulator 3-4 of the optical sampling module; and inputting a signal reflected by the microwave device to be tested into the radio frequency input port of the second test branch modulator 3-5 of the optical sampling module through the second directional coupler 2-4;

(10) dividing, by the optical coupler (3-2), an optical pulse sequence outputted by the optical pulse sequence generator (3-1) into four paths which serve as sampling pulse sequences of a first reference branch, a first test branch, a second test branch and a second reference branch; directly sampling, by the second reference branch modulator (3-9), a microwave signal outputted by the second power splitter (2-5); sampling, by the first test branch modulator (3-4) and the second test branch modulator (3-5), the signals transmitted and reflected by the device to be tested; and transmitting corresponding digital sampling results obtained from three paths of sampling signals by the photoelectric detection module (3-6) and the electrical analog-to-digital conversion module (3-7) into the signal processing module (4);

(11) calculating, by the signal processing module (4), the amplitude $A_{12}$ of a first test branch signal and a phase difference $\theta_{12}$ between the first test branch signal and a second reference branch signal to obtain the S12 parameter of the microwave device to be tested at the frequency point, wherein the parameter can be represented as $A_{12}\exp(j\theta_{12})$, wherein j is an imaginary unit;

(12) calculating, by the signal processing module (4), the amplitude $A_{22}$ of a second test branch signal and a phase difference $\theta_{22}$ between the second test branch signal and the second reference branch signal to obtain the S22 parameter of the microwave device to be tested at the frequency point, wherein the parameter can be represented as $A_{22}\exp(j\theta_{22})$, wherein j is an imaginary unit;

(13) making $f_i = f_i + \Delta f$; returning to step 3) if $f_i \leq_N$; otherwise, entering a next step; and

(14) calibrating the measured S11, S12, S21 and S22 according to known calibration parameters and corresponding calibration methods.

\* \* \* \* \*